(12) United States Patent
Clausin

(10) Patent No.: US 7,347,122 B2
(45) Date of Patent: Mar. 25, 2008

(54) DEVICE FOR FILTERING ROTATION AND TRANSMISSION VIBRATIONS FOR MOTOR VEHICLE COMPRISING SAME

(75) Inventor: Jacques Clausin, Fourqueux (FR)

(73) Assignee: Valeo Embrayages, Amiens Cedex (FR)

( * ) Notice: Subject to any disclaimer, the term of this patent is extended or adjusted under 35 U.S.C. 154(b) by 379 days.

(21) Appl. No.: 10/473,082

(22) PCT Filed: Apr. 25, 2002

(86) PCT No.: PCT/FR02/01432

§ 371 (c)(1),
(2), (4) Date: Feb. 17, 2004

(87) PCT Pub. No.: WO02/090793

PCT Pub. Date: Nov. 14, 2002

(65) Prior Publication Data

US 2004/0176171 A1  Sep. 9, 2004

(30) Foreign Application Priority Data

May 4, 2001  (FR) .................................. 01 06052

(51) Int. Cl.
*F16F 15/30* (2006.01)
*F16F 15/129* (2006.01)
*F16D 21/02* (2006.01)

(52) U.S. Cl. .................... 74/574.1; 192/48.8; 464/68.4

(58) Field of Classification Search ............. 74/574.1, 74/335; 192/48.8; 318/114; 477/5; 180/65.2; 464/68.4, 64.1; 267/196

See application file for complete search history.

(56) References Cited

U.S. PATENT DOCUMENTS

| 5,784,928 A | 7/1998 | Mokdad et al. |
| 5,921,149 A | 7/1999 | Masberg et al. |
| 6,102,144 A * | 8/2000 | Lutz .................... 180/65.2 |

(Continued)

FOREIGN PATENT DOCUMENTS

DE  32 30 607 A1  2/1984

(Continued)

OTHER PUBLICATIONS

PTO Jul. 1886, Translation of German Patent Document No. 3335923, Hybrid Drive Arrangement, USPTO Jan. 2007.*

(Continued)

*Primary Examiner*—Vinh T. Luong
(74) *Attorney, Agent, or Firm*—Berenato, White & Stavish

(57) ABSTRACT

A filtering device is provided for filtering vibrations transmitted by a rotating engine component (11) adapted to drive in rotation an output shaft (19), which device comprises a drive shaft damper (20) tuned at a frequency substantially locked within a range of frequencies to be damped: electromagnetic modulating systems (23) are designed to adapt the frequency of the damper (20) to the frequency of the vibrations transmitted by the rotary component (11). Moreover, a transmission is provided for motor vehicle comprising a drive shaft (11), linked to a rotary component formed by the motor vehicle engine crankshaft, an output shaft (19) linked to the drive shaft releasable via a clutch, a gearbox (50), the output shaft (19) being the input shaft of the gearbox (50), a filtering device being provided for filtering vibrations emitted, hence transmitted, by the rotary component.

3 Claims, 4 Drawing Sheets

U.S. PATENT DOCUMENTS

| | | | |
|---|---|---|---|
| 6,138,629 A | 10/2000 | Masberg et al. | |
| 6,176,808 B1 * | 1/2001 | Brown et al. | 477/5 |
| 6,209,692 B1 | 4/2001 | Pels et al. | |
| 6,720,746 B2 * | 4/2004 | Amann et al. | 318/114 |
| 6,729,456 B2 * | 5/2004 | Beneton et al. | 192/48.8 |
| 2004/0112158 A1 * | 6/2004 | Norum et al. | 74/335 |
| 2005/0028638 A1 * | 2/2005 | Fenioux et al. | 74/574 |

FOREIGN PATENT DOCUMENTS

| | | |
|---|---|---|
| DE | 33 35 923 A | 9/1984 |
| DE | 34 04 738 A1 | 8/1985 |
| DE | 4015701 A1 | 11/1990 |
| DE | 295 02 906 U | 4/1995 |
| DE | 195 18 672 A1 | 11/1996 |
| DE | 196 00 598 A | 7/1997 |
| DE | 197 21 298 A1 | 11/1998 |
| DE | 199 13 015 A1 | 9/2000 |
| FR | 2 658 888 | 8/1991 |
| FR | 2 816 679 * | 5/2002 |
| JP | 2002-213495 * | 7/2002 |
| WO | WO 01/14944 A1 | 3/2001 |

OTHER PUBLICATIONS

Doughty, S, Description/Abstract of Fundamentals of IC engine torsional vibration, American Society of Mechnical Engineers, Jan. 1, 1988, osti.gov/enerycitations/product.biblio.jsp?osti_id=5330624, pp. 1-2.*

Engine Speed Related Vibrations, vibratesoftware.com, 1994-2007, pp. 1-6.*

Engine Smoothness, autozine.org/technical_school/engine/smooth1.htm, 1998-2000 by Mark Wan, pp. 1-3.*

* cited by examiner

DEVICE FOR FILTERING ROTATION AND TRANSMISSION VIBRATIONS FOR MOTOR VEHICLE COMPRISING SAME

BACKGROUND OF THE INVENTION

1. Field of the Invention

The present invention relates to a device for filtering out rotational vibrations, for filtering out vibrations transmitted by a rotary power component adapted to drive an output shaft in rotation; the said rotary power component is for example the crankshaft of a motor vehicle heat engine.

2. Description of the Prior Art

Devices are known for filtering out rotational vibrations, that consist of a mass which is elastically coupled on the shaft: such devices, known as passive dampers, work very well in filtering out vibrations tuned to a single frequency which is clearly determined, but for neighbouring frequencies, the vibrations are, by contrast, amplified.

So-called active drive shaft dampers have been proposed, as for example in the document FR-A-2 658 888, the construction of which is similar to that of an electric motor; it is so controlled that the torque which it supplies works in opposition to the vibration to be filtered out, over a given range of rotation: the electrical power consumption of such devices is not insignificant.

An object of the invention is to overcome these drawbacks.

SUMMARY OF THE INVENTION

According to the invention, a filtering device for filtering out vibrations transmitted by a rotating power component adapted to drive in rotation an output shaft, which device comprises a drive shaft damper tuned to a frequency which is substantially inside the range of frequencies to be damped out, is characterised by the fact that modulating means of the electromagnetic type are provided for the purpose of matching the frequency of the damper to the frequency of the vibrations transmitted by the rotating component.

Preferably, the damper comprises a rotor consisting of a mass which is mounted elastically on the output shaft and associated with a stator, the modulating means comprising electromagnetic means carried by the rotor and the stator.

Preferably, the electromagnetic means comprise magnets defining a succession of poles carried by the rotor and coils carried by the stator and defining a succession of poles disposed in line with the magnets.

Advantageously, the coils are disposed axially in line with the magnets.

In another version, the coils are disposed radially in line with the magnets.

Preferably, the rotor is in the form of a disc or is frusto-conical or cylindrical.

Advantageously, the magnets are held in position radially by a counter-centrifugal radial retaining hoop.

Preferably, the filtering device includes a vibration sensor adapted to measure the amplitude of the vibration to be damped out.

Advantageously, means are provided for supplying current to the coils of the electromagnetic means, the said supply being responsive to the result of the measurement of amplitude performed by the vibration sensor, whereby to create in the damper a torque equal and opposite to that created by the said amplitude.

Advantageously, the device comprises a main vibration damper disposed on the output shaft upstream of the damper.

The present invention also provides a transmission for a motor vehicle of the type comprising a drive shaft, coupled to a rotary component consisting of the crankshaft of the engine of the motor vehicle, an output shaft coupled to the drive shaft releasably through a clutch, a gearbox, the said output shaft being the input shaft of the gearbox, a filtering device being provided for filtering out vibrations emitted, and therefore transmitted, by the rotary component, the filtering device being as described above.

Advantageously, the clutch comprises a reaction plate, which is coupled directly or otherwise to the rotary component, a pressure plate which is coupled in rotation to the reaction plate but displaceable axially with respect thereto, the two plate, namely the reaction plate and pressure plate, being adapted to clamp between them, under the action of axially acting resilient means, friction liners carried by a friction disc at its outer periphery, the said friction disc having a hub which is mounted in rotation on the output shaft.

Preferably, the friction disc comprises a torsion damper which constitutes the main damper.

In another version, the reaction plate constitutes the secondary part of a two-part flywheel, the other part of which, namely the primary part, is coupled to the rotary component, the two parts being coupled elastically for rotation together.

Preferably, control of disengagement of the clutch is carried out electrically, the gearbox is a so-called automated gearbox, gear changes being controlled by a computer which takes into account, in particular, information delivered by a sensor as to the speed of the input shaft of the gearbox, and by a sensor as to the speed of the output shaft of the gearbox, firstly after the clutch is disengaged, and secondly after the damper has been tuned to the speed of the input shaft of the gearbox, having regard to the new gear ratio to be engaged; a mechanical gearbox with assisted control can of course also be used: the engine ensures assistance to the synchronising operation, governed by a detector of the gear ratio engaged.

In a modified application of the invention, the damper is used as an electric motor and controlled in such a way as to supply an additional driving torque on the output shaft, besides that which is supplied by the engine of the vehicle.

In another modified version, the damper is used as an energy recuperator during braking; the clutch is disengaged during the energy recuperation phase; the gear ratios are changed down.

BRIEF DESCRPTION OF THE DRAWINGS

In order that the invention shall be more clearly understood, some embodiments, which are shown in the attached drawings, will now be described by way of purely illustrative and non-limiting example.

DETAILED DESCRIPTION OF THE INVENTION

Figure 1:
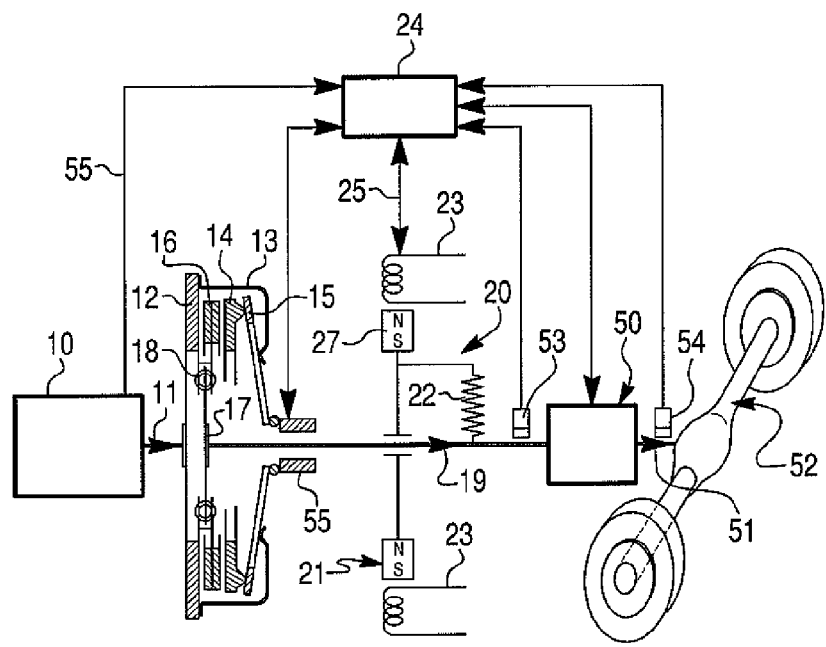
FIG. 1 is a diagram illustrating the application of the invention to a transmission for a motor vehicle.

With reference to FIG. 1, this shows the application of the invention to a transmission for a motor vehicle comprising, starting from an engine 10 of the vehicle, a drive shaft or crankshaft 11, the engine being coupled to a flywheel or reaction plate 12, and a clutch mechanism consisting of a cover plate 13 which supports a pressure plate 14 and axially acting resilient means, in this example a diaphragm 15.

Axially disposed between the reaction plate 12 and pressure plate 14, a friction disc 16 carries at its outer periphery friction liners which are adapted to be gripped axially between the said plates 12 and 14, and a central hub 17 which is connected elastically, through circumferentially acting springs 18, to the peripheral portion carrying the said liners.

The hub 17 of the friction disc 16 is mounted in rotation on a so-called output shaft 19.

Since these clutches are well known, they will not be described any more here.

A drive shaft damper 20 is mounted on the output shaft 19.

The damper 20 consists of a mass 21 or rotor, which is mounted for rotation about the output shaft 19, with which it is coupled elastically through an interposed spring 22.

In accordance with the invention, modulating means (or device) are provided for matching the frequency of the damper 20 to the frequency of vibrations transmitted through the drive shaft 11 via the damper disc 16, and not filtered by the latter.

These modulating means are of the electromagnetic type, and in this example they consist of magnets 27 located at the periphery of the rotor 21, with which inductive windings, carried by a stator, which is indicated diagrammatically at 23 in FIG. 1, are arranged to cooperate electromagnetically.

The damper 20 is tuned to a frequency which is within the range of frequencies to be damped out; by passing through the inductive windings 23 a current which is a function of the amplitude measured, for example by a vibration sensor not shown, that is to say the amplitude of the vibration to be damped out, an oscillating torque is set up which is opposed to the vibration.

A computer 24 receives the measurement in real time of the vibration that remains to be damped out, so as to set the current which is to pass through the windings 23, operation being therefore, with advantage, of the closed loop type.

Thanks to the invention, the electric power consumed by the filtering device is only of the order of a hundred watts.

In the diagram of FIG. 1, the windings 23 are disposed radially in line with the magnets of the rotor 21.

Figure 2:
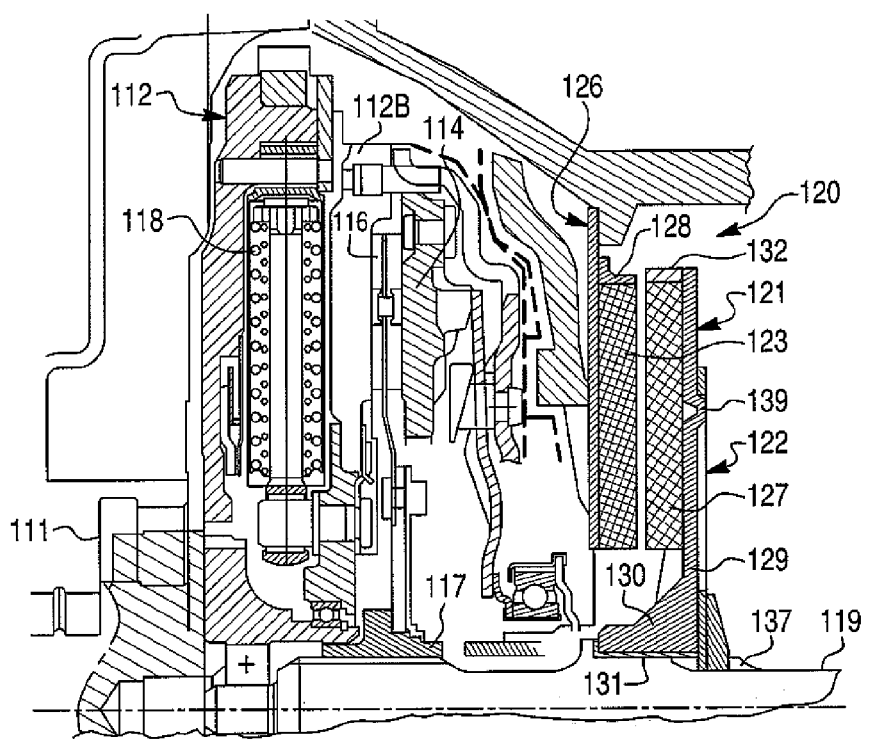
FIG. 2 is a partial view in cross section showing another version.

In a modified version in FIG. 2, they are disposed axially in line with the magnets.

More precisely, with reference to FIG. 2, this shows a drive shaft damper 120 consisting of a rotor 121 and a stator 126.

The stator 126 carries the windings 123; a ring 128 with an L-shaped cross section is carried by the stator 126 and provides centring for the coils and fastening of the stator 126.

The rotor 121 comprises a disc 129 which is provided with a hub 130 mounted for free rotation on the output shaft 119 through, here, an interposed plain bearing 131; the disc 129 carries, on its surface that faces towards the windings 123, magnets 127; an annular hoop 132, which is for example made of steel, or glass fibres, or some other material, secures the fastening of the magnets 127 against centrifugal force.

A spring 122 couples the rotor 121 and output shaft 119 together elastically in rotation.

Figure 3:
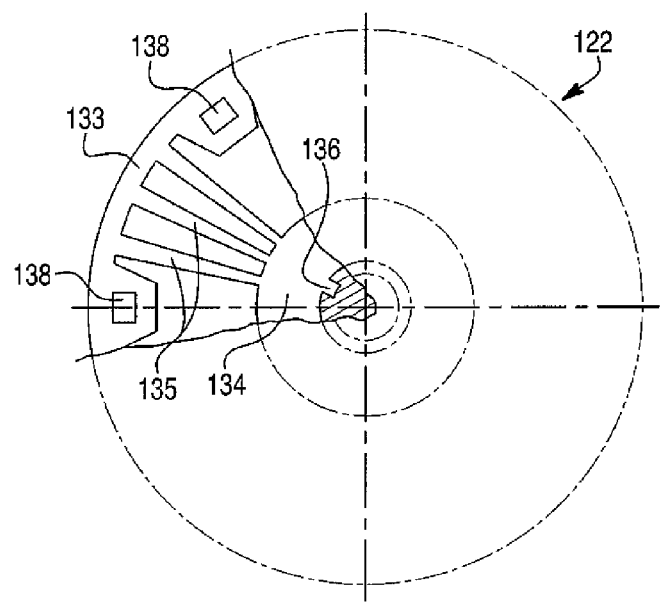
FIG. 3 is a plan view showing part of the spring of the drive shaft damper in FIG. 2.

This spring 122, which is best seen in FIG. 3, is in the form of a disc which is cut out in such a way that it has an annular outer rim 133 and an inner annular rim 134, which are joined together by arms 135 that are generally radial in this example.

The annular inner rim 134 has at its inner periphery teeth 136 which are adapted to cooperate with grooves 137, FIG. 2, of the shaft 119 so as to couple the spring 122 and output shaft 119 together in rotation.

The annular outer rim 133 has apertures 138 which are adapted to cooperate with axial bosses 139, FIG. 2, which are formed in the disc 129 for coupling the rotor 121 and spring 122 together in rotation.

In the present case, the damper 120 is associated with a clutch in which the liners of the friction disc 116 are coupled rigidly with the hub 117, while the reaction plate 112B, associated with the pressure plate 114, constitutes the secondary part of a two-part flywheel 112, the primary part 112A of which is coupled directly to the rotating member 111, the primary part 112A and secondary part 112B both being coupled elastically to each other in rotation, in this example through interposed springs 118 extending generally radially.

Figure 4:
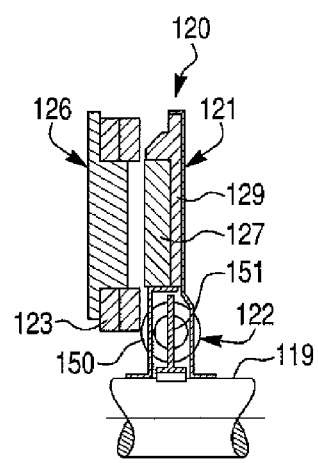
FIG. 4 is a scrap view in cross section showing another version of the damper spring.

In FIG. 4, the damper 120 is similar to that in FIG. 2, but here the spring 122 consists of a plurality of helical springs 150 which bear on the radial edges, on one side, of windows which are formed in a radial disc 151 which is coupled in rotation with the shaft 119, and on the other side, of windows formed in counter-plates 152 disposed on either side of the plate 151 and mounted in rotation on the shaft 119 and coupled in rotation to the yoke 129 which carries the magnets 127.

As has been seen in particular with respect to FIG. 2, the rotor 121 of the damper 120 is mounted on the shaft 119 by means of its hub 130, the spring 122 being disposed kinematically between the rotor 121 and shaft 119.

Figure 5:
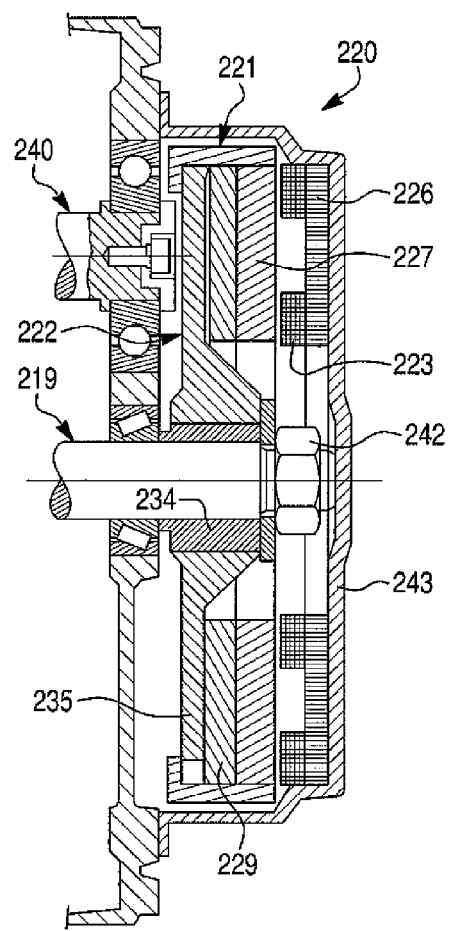
FIG. 5 is a view in cross section of a further version of the damper.

The drive shaft damper 220 shown in FIG. 5 is mounted on the end of the primary shaft 219 of the gearbox, the secondary shaft of which can be seen at 120. In this example it is the spring 222 that supports the rotor 221 of the damper; for this purpose it has an annular inner rim 234 in the form of a hub, which is secured axially on the end of the shaft 219 by a nut 241 screwed on to the shaft 219, with a washer 242 interposed; the outer ends of the arms 235 of the spring 222 are in mesh with axial returns of the disc 229, in the form of a yoke carrying the magnets 227, in line with which the windings 223 carried by the armature 226 of the stator are placed, which armature 226 is itself carried by the base portion of a cover plate 243; preferably, the armature 226 is made in laminated form, by winding a metallic band around the axis of the shaft 219, or in the form of a plurality of sintered iron elements, whereby to minimise losses due to Foucault currents.

Figure 6:
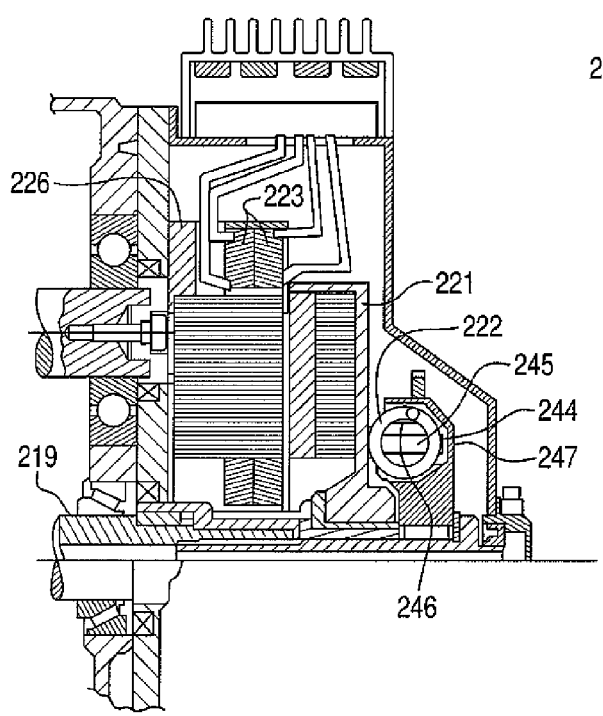
FIG. 6 is a partial view, in cross section, showing another version of the damper shown in FIG. 5.

FIG. 6 shows a variant of the drive shaft damper 220 which is located at the end of the primary shaft 219 of the gearbox. In this case, the axial order of the stator 226 and rotor 221 has been reversed, the rotor 221 being disposed on the outside; the rotor 221 is mounted in rotation on the shaft 219 and carries, directed outwards, a skirt 244 which extends parallel to the axis of the shaft 219 and which is formed with circumferential slots 245, and the springs 222 engage on one side against one of the edges of these slots; on the other side, the springs 222 which extend circumferentially bear on transverse returns 246 of a solid ring 247 which is mounted in rotation on the shaft 219.

Figure 7:
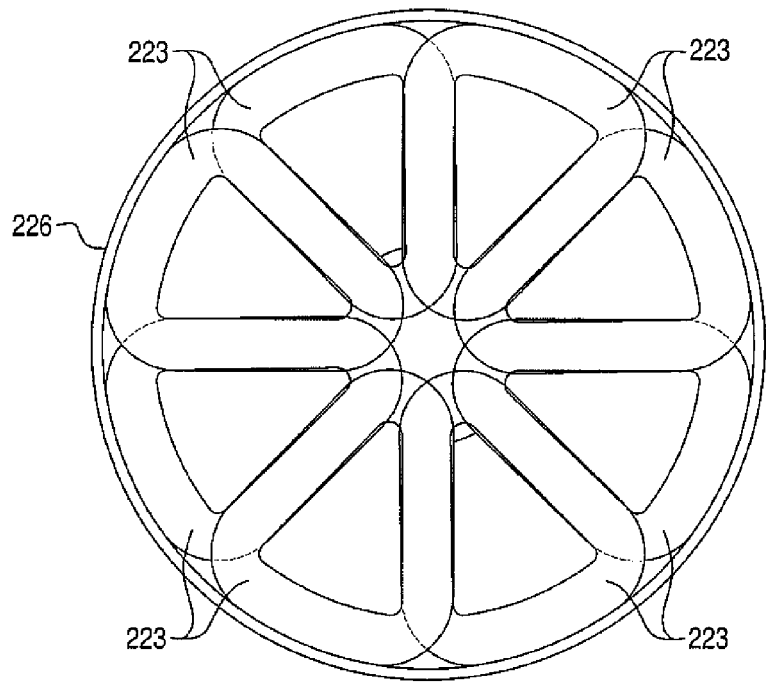
FIG. 7 is a partial view in transverse cross section showing the arrangement of the windings in the damper of FIG. 6.

In this example, the windings 223 are in the form of coils which are not interleaved but, as can be seen in FIG. 7, are disposed in two superimposed rows.

Figure 8:
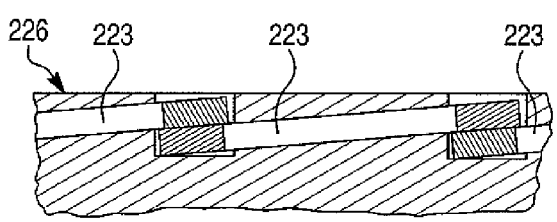
FIG. 8 is a scrap side view showing another arrangement of the windings.

In another version they are interleaved, with the edge of one coil lying on the edge of the next as shown in FIG. 8: in this configuration, the coils are slightly inclined with respect to a transverse plane at right angles to the axis of the shaft 219.

Thanks to the drive shaft damper according to the invention, it is also possible to synchronise the shafts concerned during gear changes, especially where the gear changes may be carried out by means of electrically controlled actuators, as is the case in so-called automated gearboxes.

In the diagram of FIG. 1, such a gearbox 50 can be seen disposed between the input shaft 19 and output shaft 51 for driving the drive train 52 of a motor vehicle.

Thus, when the shaft 19 is released following the declutching operation, the velocity of this shaft is rapidly reset according to the gear ratio to be engaged; such an arrangement has the advantage that it gives the drive shaft damper the function of a centralised synchroniser, and conventional synchronisers arranged in each gear ratio are omitted; in addition, synchronisation time is reduced, as is cost.

Operation is precise, and is facilitated by the presence of speed sensors 53, 54 upstream and downstream of the gearbox 50; by providing for an electrically controlled declutching actuator 55, the computer 24, which incorporates the electronic power control, generates all the functions described above, also having regard to certain parameters 65 of the engine, such as torque, speed, etc.

As to the damping function of the drive shaft damper, its closed loop operation described above may be replaced by operation in accordance with a vibration map, as a function of various parameters predetermining the values of torque to be given to the damper.

Figure 9:
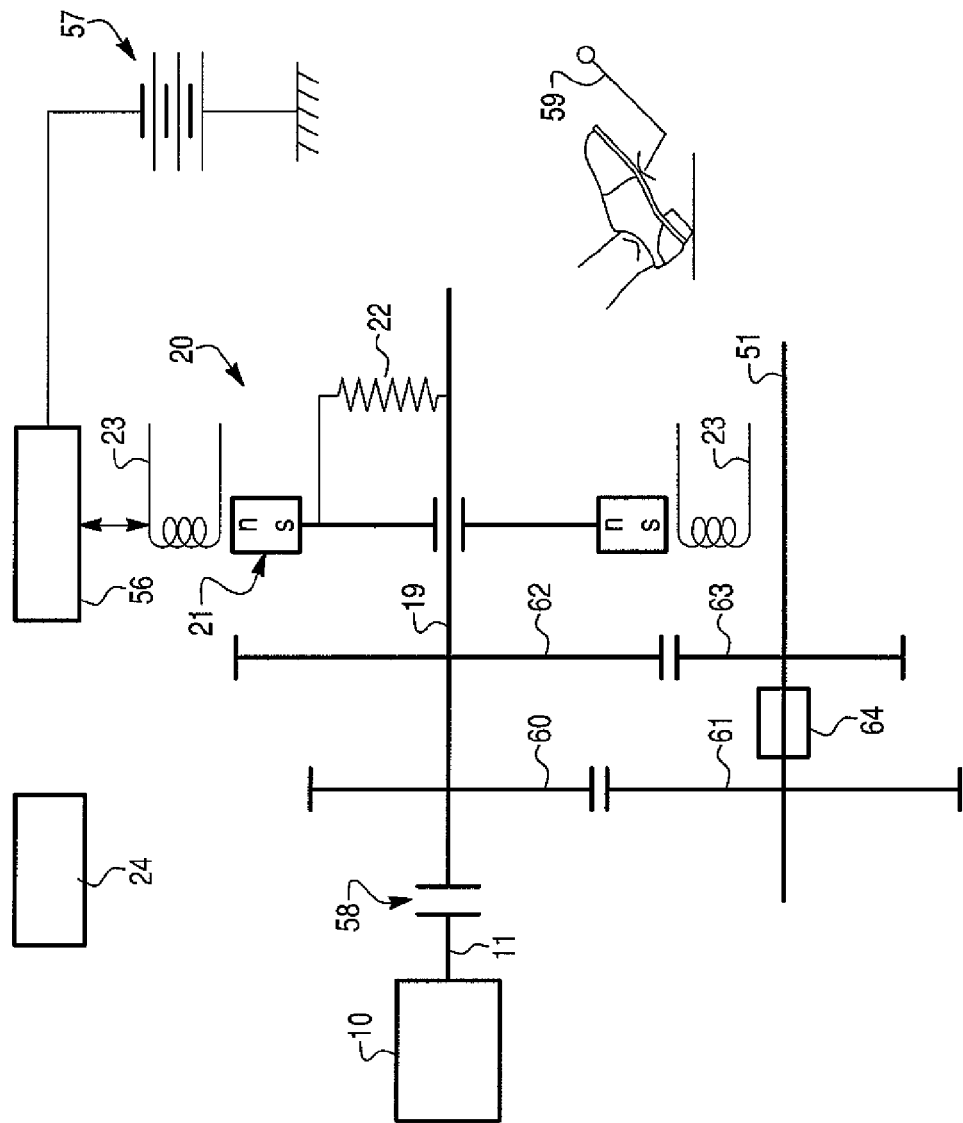
FIG. 9 is a diagram of the same kind as that in FIG. 1, showing a further application of the invention.

It will also be understood that the damper may be used as an energy recuperator, or even as an alternator and synchronous motor; with reference to FIG. 9, this shows an embodiment in which the damper 20 is mounted on the primary shaft 19 of the gearbox, downstream of a clutch 58; this primary shaft 19 in this example carries two pinions 60, 62 associated with two pinions 61, 63 respectively which are carried by the secondary or output shaft 51; a controlled dog-clutch 64 ensures that the said secondary shaft 51 will be driven either by the pinion 61 or by the pinion 63.

Thanks to a fastening device 56, the battery 57 of the vehicle may be charged for example during a braking operation; by action on the brake pedal 59, after the accelerator has been released, the clutch 58 is disengaged and the damper 20 operates as a generator which discharges into the battery 57; in order that the speed of rotation of the generator is sufficiently high, the gears are changed down by controlling the clutch 64.

The invention claimed is:

1. A transmission for a motor vehicle comprising:
   a drive shaft (11, 111) coupled to an engine of the motor vehicle;
   an output shaft (19, 119, 219) coupled to the drive shaft releasably through a clutch;
   a gearbox (50) drivingly connected to the output shaft (19, 119, 219); and
   a filtering device provided for filtering out vibrations emitted and transmitted by the drive shaft (11, 111) to the output shaft (19, 119, 219);
   the filtering device comprising a drive shaft damper (20, 120, 220) tuned to a frequency which is inside the range of frequencies to be damped out, and a modulating device of the electromagnetic type provided for matching the frequency of the damper (20, 120, 220) to the frequency of the vibrations transmitted by the drive shaft (11, 111), wherein the clutch comprises a reaction plate (12, 112B) which is coupled to the drive shaft (11, 111), a pressure plate (14, 114) coupled to the reaction plate (12, 112B) but displaceable axially with respect thereto, the reaction plate (12, 112B) and pressure plate (14, 114) being adapted to clamp therebetween, under the action of axially acting resilient means (15), a friction disc (16, 116), the friction disc (16, 116) having a hub (17, 117) which is mounted on the output shaft (19, 119, 219).

2. The transmission according to claim 1, wherein the friction disc (16) comprises a torsion damper which constitutes the main damper.

3. The transmission according to claim 1, wherein the reaction plate (112B) constitutes the secondary part of a two-part flywheel (112), the other part of which, namely the primary part (112A), is coupled to the rotary component (111), the primary and secondary parts (112A, 112B) being coupled elastically for rotation together (118).

* * * * *